United States Patent
Liu et al.

(10) Patent No.: US 9,710,082 B2
(45) Date of Patent: Jul. 18, 2017

(54) WEARABLE DISPLAY DEVICE, BELT BUCKLE AND BELT

(71) Applicants: BOE TECHNOLOGY GROUP CO., LTD., Beijing (CN); HEFEI BOE DISPLAY LIGHT CO., LTD., Hefei, Anhui (CN)

(72) Inventors: Gang Liu, Beijing (CN); Shuyong He, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 0 days.

(21) Appl. No.: 14/764,103

(22) PCT Filed: Nov. 19, 2014

(86) PCT No.: PCT/CN2014/091684
§ 371 (c)(1),
(2) Date: Jul. 28, 2015

(87) PCT Pub. No.: WO2016/029568
PCT Pub. Date: Mar. 3, 2016

(65) Prior Publication Data
US 2016/0246392 A1 Aug. 25, 2016

(30) Foreign Application Priority Data
Aug. 27, 2014 (CN) .......................... 2014 1 0428256

(51) Int. Cl.
*G06F 3/041* (2006.01)
*G09G 3/20* (2006.01)
(Continued)

(52) U.S. Cl.
CPC ............... *G06F 3/041* (2013.01); *G09G 3/20* (2013.01); *G09G 3/3406* (2013.01); *A41F 9/002* (2013.01);
(Continued)

(58) Field of Classification Search
CPC .................................. G06F 1/163; G06F 1/041
See application file for complete search history.

(56) References Cited

U.S. PATENT DOCUMENTS

2004/0017524 A1* 1/2004 Li ..................... G02F 1/133516
349/106
2004/0037051 A1* 2/2004 Hagiwara ............... G06F 1/163
361/749
(Continued)

FOREIGN PATENT DOCUMENTS

CN 101673514 A 3/2010
CN 201527777 U 7/2010
(Continued)

OTHER PUBLICATIONS

First Office Action regarding Chinese application No. 201410428256.2, dated Nov. 14, 2016. Translation provided by Dragon Intellectual Property Law Firm.
(Continued)

*Primary Examiner* — Liliana Cerullo
(74) *Attorney, Agent, or Firm* — Harness, Dickey & Pierce, P.L.C.

(57) ABSTRACT

The present disclosure provides a wearable display device, a belt buckle and a belt. The wearable display device includes a body; a display screen arranged on the body; a storage module configured to store data; and a controller configured to output a display signal in accordance with the data stored in the storage module, thereby to enable the display screen to display the display signal from the con-
(Continued)

troller. According to the present disclosure, the wearable display device can display stationary or dynamic images, thereby to meet the user's individualized requirements.

8 Claims, 2 Drawing Sheets

(51) Int. Cl.
    *G09G 3/34*     (2006.01)
    *A44B 11/00*     (2006.01)
    *A41F 9/00*     (2006.01)

(52) U.S. Cl.
    CPC ... *A44B 11/001* (2013.01); *G06F 2203/04102* (2013.01); *G09G 2320/0626* (2013.01); *G09G 2330/02* (2013.01); *G09G 2380/02* (2013.01)

(56) References Cited

U.S. PATENT DOCUMENTS

| | | | |
|---|---|---|---|
| 2004/0077969 A1* | 4/2004 | Onda | A61B 5/0537 600/547 |
| 2004/0263494 A1* | 12/2004 | Poor | A63F 13/10 345/204 |
| 2010/0060669 A1* | 3/2010 | Cheng | G09G 3/3406 345/690 |
| 2011/0157876 A1* | 6/2011 | Wang | H01L 27/3227 362/183 |
| 2016/0134737 A1* | 5/2016 | Pulletikurty | G06F 3/0227 715/735 |

FOREIGN PATENT DOCUMENTS

| | | |
|---|---|---|
| CN | 101822435 A | 9/2010 |
| CN | 202394502 U | 8/2012 |
| CN | 102790827 A | 11/2012 |
| CN | 202887638 U | 4/2013 |
| CN | 103189910 A | 7/2013 |
| CN | 103903991 A | 7/2014 |

OTHER PUBLICATIONS

International Search Report and Written Opinion of the International Searching Authority for international application No. PCT/CN2014/091684, dated Nov. 19, 2014.

"Material 1 Samsung developed the largest flexible LCD screen," http://www.fpdisplay.com/news/2010-10/info-56903-655.htm, Oct. 12, 2010.

"Material 2 What are the prospects for flexible displays?" http://av.imaschina.com/issue/t_obs/2012/9074.html, 2012.

"Material 3 Naked eye 3D display for mobile phone," http://baike.baidu.com/view/10362770.htm, Mar. 29, 2013.

"Material 4 What is naked eye 3D film?" http://wenku.baidu.com/view/7555dt2b2af90242a895e567.html, Apr. 28, 2012.

"Material 5 MIT developed a naked-eye 3D woven flexible display," http://bp.imaschina.com/news/industry/2012/13569.html, Mar. 13, 2012.

"Material 6 FDC developed the world's first flexible touch-screen display," http://www.fpdisplay.com/news/2010-10/info-4684-817.htm, Oct. 12, 2010.

Second Office Action regarding Chinese Application No. 201410428256.2, dated Apr. 26, 2017. Translation provided by Dragon Intellectual Property Law Firm.

* cited by examiner

WEARABLE DISPLAY DEVICE, BELT BUCKLE AND BELT

CROSS-REFERENCE TO RELATED APPLICATION

The present application is the U.S. national phase of PCT Application No. PCT/CN2014/091684 filed on Nov. 19, 2014, which claims a priority of the Chinese patent application No. 201410428256.2 filed on Aug. 27, 2014, which is incorporated herein by reference in its entirety.

TECHNICAL FIELD

The present disclosure relates to the field of wearable devices, in particular to a wearable display device capable of displaying images, a belt buckle and a belt.

BACKGROUND

Along with the development of technologies and the improvement of people's living standards, more and more individualized electronic devices have been developed. However, the inventor finds that, a wearable device used by a user, such as a belt, is of fewer functions, and thus cannot meet the user's individualized requirements.

SUMMARY

An object of the present disclosure is to provide a wearable display device, so as to achieve a display function through the wearable display device with a simple structure, thereby to meet the user's individualized requirements.

In one aspect, the present disclosure provides in one embodiment a wearable display device, including:
a body;
a display screen arranged on the body;
a storage module configured to store data; and
a controller configured to output a display signal in accordance with the data stored in the storage module, thereby to enable the display screen to display the display signal output from the controller.

Further, the wearable display device includes a power supply module configured to supply power to the controller, the storage module and the display screen, and a light sensor configured to detect light intensity and generate a light sensing signal. The controller includes a first control module configured to control the display screen to adjust its brightness in accordance with the light sensing signal from the light sensor.

Further, the power supply module includes a solar power supply module and a storage battery power supply module. The controller further includes a second control module configured to receive the light sensing signal from the light sensor, and control the solar power supply module to supply power to the controller and control the solar power supply module to charge the storage battery power supply module when the light sensing signal is greater than a predetermined value; and a third control module configured to receive the light sensing signal from the light sensor, and control the storage battery power supply module to supply power to the controller and control the solar power supply module to be charged when the light sensing signal is less than the predetermined value.

Further, the wearable display device includes a power supply module configured to supply power to the controller, the storage module and the display screen, and a distance sensor configured to detect a distance between an external occlusion and the body and generate a distance sensing signal. The controller further includes a fourth control module configured to control on and off states of the power supply module in accordance with the distance sensing signal from the distance sensor.

Further, the display screen is a flexible screen protruding toward an outer side of the body and having a curved surface.

Further, the display screen includes a display surface and a back surface opposite to the display substrate, and a reflective layer is arranged at a side of the back surface of the display screen.

Further, the display screen includes a transparent touch panel connected to the controller and having a touch function, and a display panel connected to the controller and having a display function, and the display panel is located below the transparent touch panel.

In another aspect, the present disclosure provides in one embodiment a belt buckle including the above-mentioned wearable display device.

In yet another aspect, the present disclosure provides in one embodiment a belt including the above-mentioned belt buckle and a belt body. A flexible touch module is arranged on the belt body in an extension direction of the belt body. A belt clip portion of the belt buckle for buckling the belt body is provided with a static contact configured to be in contact with the flexible touch module so as to generate a current. The belt body is provided with at least two electrodes configured to receive a current signal generated when the static contact is in contact with the flexible touch module, and the at least two electrodes are arranged at two ends of the flexible touch module, respectively. The controller further includes a data conversion module configured to convert the current signal received by the at least two electrodes into waistline data.

Further, the data conversion module includes: an analog-to-digital (A/D) converter configured to convert the current signal received by the at least two electrodes into a digital signal; an operation module configured to convert the digital signal into position information of a contact point where the static contact is in contact with the flexible touch module and acquire the waistline data in accordance with the position information; and a storage module configured to store the waistline data.

According to the embodiments of the present disclosure, the wearable display device may be applied to the belt buckle, so as to display stationary or dynamic images, thereby to meet the user's individualized requirements. In addition, the wearable display device can intelligently adjust the display brightness of the display screen and automatically switch on or off the display screen in accordance with the ambient conditions. Moreover, the belt can monitor the waistline data continuously.

DETAILED DESCRIPTION

Principles and features of the present disclosure will be described hereinafter in conjunction with the drawings. The following embodiments are for illustrative purposes only, but shall not be used to limit the scope of the present disclosure.

In the related art, a wearable device such as a belt is of fewer functions, and cannot meet the user's individualized requirements. In order to overcome this drawback, the present disclosure provides in one embodiment a wearable display device, so as to display stationary or dynamic images at a surface of the wearable device with a simple structure, thereby to meet the user's individualized requirements.

Figure 1:
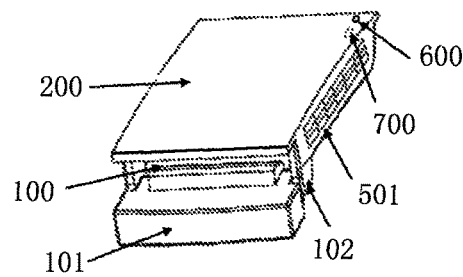
FIG. 1 is a three-dimensional structure diagram of a wearable display device in accordance with one embodiment of the present disclosure.
Figure 2:
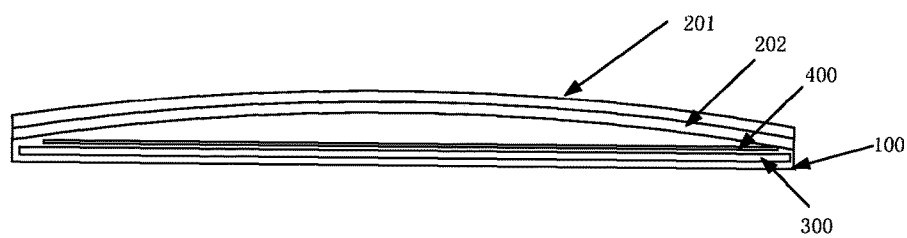
FIG. 2 is a sectional view of the wearable display device in accordance with one embodiment of the present disclosure.
Figure 3:
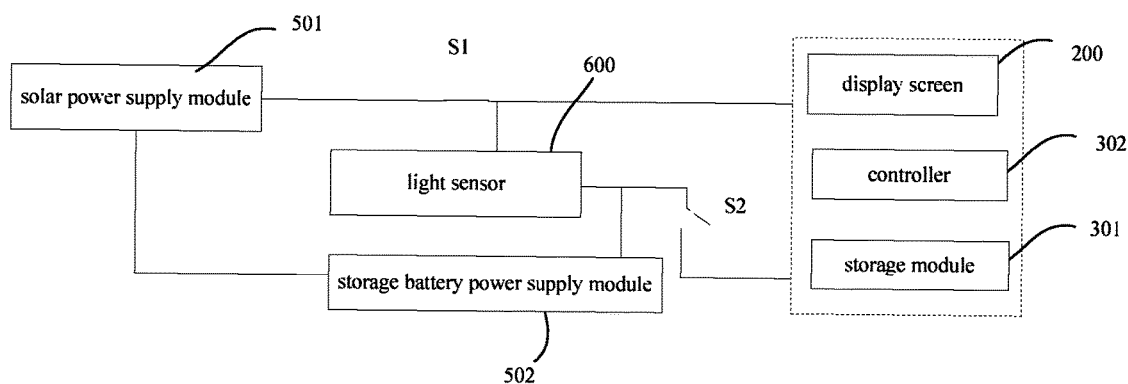
FIG. 3 is a schematic view showing a power supply mode of a power supply module in the wearable display device in accordance with one embodiment of the present disclosure.

As shown in FIGS. 1-3, the wearable device includes:
a body 100;
a display screen 200 arranged on the body 100;
a storage module 301 configured to store data; and
a controller 302 configured to output a display signal in accordance with the data stored in the storage module 301, thereby to enable the display screen 200 to display the display signal output from the controller 302.

In the embodiment, the display screen 200 is arranged on an existing wearable device so as to display information, thereby to meet the user's individualized requirements.

The following description is given by taking the wearable display device being a belt buckle as an example.

The body 100 may include a belt clip portion 101 configured to buckle a belt body of the belt, and a base portion 102 constituting a frame of the belt buckle. The display screen 200 is mounted on an outer surface of the base portion 102. The storage module 301 and the controller 302 may be integrated into a main board 300, and arranged inside the base portion 102 and at a back surface of the display screen 200.

As shown in FIGS. 1 and 2, in one embodiment, alternatively, the display screen 200 is a flexible screen protruding toward an outer side of the body 100 and having a curved surface. In this way, it is able to, on one hand, provide the display screen 200 with a well appearance, and on the other hand, provide at the back surface of the display screen 200 a space within which the main board 300 including the storage module 301 and the controller 302 may be arranged, thereby to provide a thin wearable display device.

In the above solutions, the flexible screen may be a flexible thin film transistor liquid crystal display (TFT-LCD), a flexible organic light-emitting diode (OLED) display screen or a flexible E-ink screen (a flexible E-book screen).

Comparing with a glass base substrate of a traditional LCD, a base substrate of the flexible LCD may be made of a flexible material so as to achieve flexible display. The base substrate may be manufactured in two ways. In one way, glass used in a traditional silicon-on-glass process is replaced with a heat-resistant, flexible material such as an ultrathin tin foil and high-temperature resistant plastics, and in the other way, a silicon semiconductor is replaced with an organic semiconductor so as to adhere a TFT onto a flexible plastic film through cold deposition.

For the flexible OLED display screen, a self-luminescent material may be applied onto a plastic film, so as to achieve the flexible, full-color display in accordance with self-luminescence characteristics of an OLED material.

For the flexible E-ink screen, the flexible display may be achieved on the basis of electrophoresis or metal-foil-based technology.

Alternatively, the display screen 200 includes a display surface and a back surface opposite to the display surface, and a reflective layer 400 is arranged at a side of the back surface of the display screen 200. In this way, the display screen 200 can be prevented from being adversely affected by various structures (e.g., circuits on the main board 300) at the back surface. Base material of the reflective layer 400 may adopt polyethylene terephthalate (PET), and white reflective particles applied onto two opposite surfaces of the base material, so as to prevent a light beam reflected by the main board 300 from entering the display screen 200, thereby to improve a visual effect.

Alternatively, the display screen 200 has both display and touch functions. As shown in FIGS. 1-3, the display screen 200 may include a transparent touch panel 201 connected to the controller 302 and having a touch function, and a display panel 202 connected to the controller 302 and having a display function. The display panel 202 is arranged below the transparent touch panel 201.

The touch function of the display screen is achieved by the transparent touch panel 201. The transparent touch panel 201 is connected to the main board 300 through a flexible printed circuit (FPC). A daily-used belt buckle is scratched frequently, so alternatively, a base substrate of the transparent touch panel 201 is made of glass or polymethyl methacrylate (PMMA) with good transparency and resilience, so as to provide the transparent touch panel with certain scratch resistance.

It should be appreciated that, the display screen 200 may also be a touch display panel having both touch and display functions and formed by an in-cell process (where a touch panel function is embedded into pixels) or an on-cell process (where the touch panel function is embedded between a color filter substrate and a polarizer).

Alternatively, the display screen 200 is a naked-eye three-dimensional (3D) display screen. To be specific, a naked-eye 3D function of the display screen 200 may be achieved in following ways.

When the display screen 200 is an LCD, the naked-eye 3D function may be achieved by a light barrier technique, a lenticular lens technique or a directional backlight technique. When the display screen 200 is an OLED display screen, the naked-eye 3D function may be achieved by superposing transparent OLEDs. When the display screen 200 is an E-book screen, the naked-eye 3D function may be achieved by adhering a 3D film onto the E-book screen.

Alternatively, the wearable device may further include a power supply module configured to supply power to the controller 302 and the display screen 200, and a light sensor 600 configured to detect light intensity and generate a light sensing signal.

The control 302 may include a first control module configured to control the display screen 200 to adjust its brightness in accordance with the light sensing signal from the light sensor 600.

A first light-entering hole may be arranged in the base portion 102 of the belt buckle, and the light sensor 600 may be integrated into the main board 300 inside the base portion 102. The light sensor 600 is arranged at a position corresponding to the first light-entering hole.

For example, when the detected light intensity is strong and greater than a predetermined value, e.g., 100000lux, the first control module may control the display screen 200 to increase its brightness, so that the display screen 200 may be observed by the user clearly even in a bright environment. When the detected light intensity is weak and less than a predetermined value, e.g., 3000lux, the first control module may control the display screen 200 to decrease its brightness. When the detected light intensity is in a predetermined range, e.g., greater than 3000lux and less than 100000lux, the brightness of the display screen 200 remains unchanged.

In one embodiment, the light sensor may be a CAPELLA® CM366 sensor or a TAOS® TMD277 sensor.

Alternatively, the belt buckle may further include a power supply module configured to supply power to the controller 302 and the display screen 200, and a distance sensor 700 configured to detect a distance between an external occlusion and the body 100 and generate a distance sensing signal. The controller 302 may further include a fourth control module configured to control on and off states of the power supply module in accordance with the distance sensing signal from the distance sensor 700.

A second light-entering hole may be arranged in the base portion 102 of the belt buckle, and the distance sensor 700 may be integrated into the main board 300. The distance sensor 700 may be arranged at a position corresponding to the second light-entering hole. The distance sensor 700 may detect the distance between the external occlusion and the body 100 (the belt buckle). When the detected distance is less than a predetermined value (when a distance between an object and the belt buckle is very small, e.g., clothing covers the belt buckle), the fourth control module may automatically switch off a power supply circuit of the display screen 200, so as to enable the display screen 200 to be in a sleep state, thereby to prolong a service life of the display screen and reduce the power consumption. The distance sensor 700 may be an EVERLIGHT® APS-12D sensor.

It should be appreciated that, the controller 302 may be used to automatically control the on and off states of the power supply module in accordance with a predetermined time period. For example, at a first predetermined time period (e.g., system time is from 8 am to 6 pm), the power supply module supplies power to the entire device, and the light sensor 600 and the distance sensor 700 are both in an operating state. The first control module may control the display screen 200 to adjust its brightness in accordance with the light sensing signal from the light sensor 600, and the fourth control module may control the on and off states of the power supply module in accordance with the distance sensing signal from the distance sensor 700. At time periods other than the first time period, the power supply module is switched off automatically, and the light sensor 600 and the distance sensor 700 are both in an off state. As a result, in the day when the wearable display device is worn by the user, the wearable display device can automatically adjust the brightness of the display screen in accordance with ambient brightness, and control the on and off states of the power supply module in accordance with whether the clothing covers the display screen, while in the night when the wearable display device is not worn by the user, the wearable display device is in the off state.

Of course, it should be appreciated that, the wearable display device may further be provided with a control switch, through which the user may manually control the on and off states of the power supply module in accordance with the practical need.

Alternatively, the power supply module includes a solar power supply module 501 and a storage battery power supply module 502. The controller 302 may further include a second control module configured to receive the light sensing signal from the light sensor 600, and control the solar power supply module 501 to supply power to the controller 302 and control the storage battery power supply module 502 to be charged when the light sensing signal is greater than a predetermined value; and a third control module configured to receive the light sensing signal from the light sensor 600, and when the light sensing signal is less than the predetermined value, control the storage battery power supply module 502 to supply power to the controller 302 and control the solar power supply module 501 to be charged.

In the above technical solution, the power may be supplied by the solar power supply module and the storage battery power supply module to the wearable display device. When there is sufficient sunlight (the light intensity detected by the light sensor is greater than a predetermined value, e.g., 500lux), a first switch S1 is in an closed state and a second switch S2 is opened under the control of the second control module. At this time, the power is directly supplied by the solar power supply module to the wearable display device, and the storage battery power supply module 502 is charged by the solar cell power supply module 501. When there is insufficient sunlight or in a dark environment (the light intensity detected by the light sensor is less than the predetermined value, e.g., 500lux), the first switch S1 is opened and the second switch S2 is closed under the control of the third control module. At this time, the power is supplied by the storage battery power supply module 502 to the wearable display device and the solar power supply module 501 is charged with the solar energy. In this way, the power supply can be ensured when there is insufficient sunlight, thereby to ensure the long-term, efficient operation of the wearable display device.

In one embodiment, the wearable display device may further include an audio module for the operation of an audio device (e.g., a loudspeaker or a microphone). The controller 302 may read an audio file or sound recording in the storage module 301, and output an audio signal to the audio module. Then, the audio module controls the audio device to play the audio signal. In this way, the belt buckle may play the sound corresponding to a displayed image, so as to facilitate the human-machine interaction. The audio module may adopt TI® Stereo Audio Code chip TLV320AIC23 (AIC23 for short), TI® TMS320VC5402, or SAMSUNG® S3C4510B.

The procedure of displaying an image by the wearable display device will be described hereinafter.

In one embodiment of the present disclosure, the controller 302 of the wearable display device may include an operation module, a display module and a flexible touch module. The storage module 301 may transmit media resource data stored therein, such as naked-eye 3D pictures, to the operation module of the controller 302 in the form of binary codes. The operation module may process the media resource data and transmit a display signal to the display module. The display module may control the display screen 200 to display the display signal.

When the touch panel is touched, the flexible touch module of the controller 302 may be triggered to generate a touch signal, the touch signal is converted by the operation module into coordinates of a touch point, and an operation on the image may be performed under the control of an operating system of the controller 302.

The operation module may be a central processing unit (CPU), e.g., Intel® ARM, Qualcomm® Snapdragon or TI® OMPA, and it may composed of an arithmetic logic unit, an accumulator, a state register and a general purpose register.

The storage module 301 may be a random access memory (RAM) for internal operational data, or a built-in or external read only memory (ROM), e.g., a TF or micro card, for relevant resources such as system software, pictures and audio data.

The display module may be a module suitable for a high-resolution and small-sized LCD, such as LCMB899 or LCM12864. Alternatively, the display module may include Tyloo® D500 so as to achieve the naked-eye 3D display.

In addition, the operating system of the controller 302 may control and manage software and hardware resources for function implementation, so as to coordinate the operations of members. To be specific, the operating system may be an IOS system written by using Darwin as a source code, or an Android system, a Symbian system or a Window Phone system written by using Linux as a source code.

The present disclosure further provides in one embodiment a belt buckle including the above-mentioned wearable display device.

Figure 4:
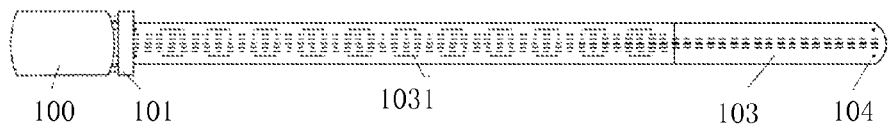
FIG. 4 is a front view of a belt in accordance with one embodiment of the present disclosure.
Figure 5:
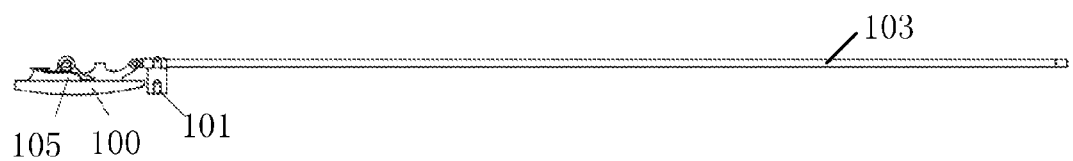
FIG. 5 is a side view of the belt in accordance with one embodiment of the present disclosure.
Figure 6:
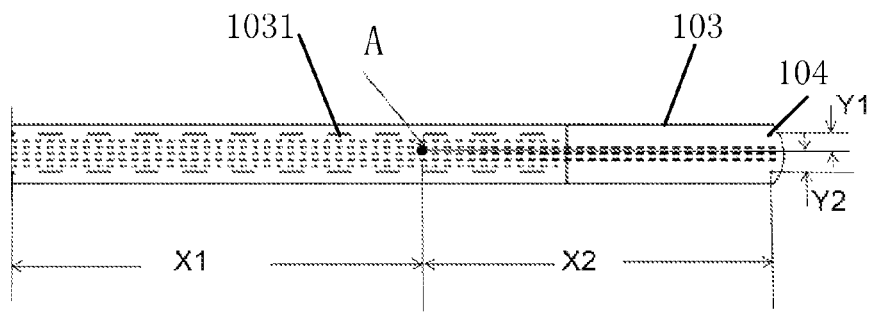
FIG. 6 is a schematic view showing a principle according to which the belt measures a waistline in accordance with one embodiment of the present disclosure.

The present disclosure further provides in one embodiment a belt capable of reading waistline data. As shown in FIGS. 4-6, the belt includes the belt buckle 100 and a belt body 103.

A flexible touch module 1031 is arranged on the belt body 103 in an extension direction of the belt body 103. A belt clip portion 101 of the belt buckle 100 for bucking the belt body 103 is provided with a static contact configured to be in contact with the flexible touch module 1031 so as to generate static electricity. The belt body 103 is provided with at least two electrodes 104 configured to receive a current signal generated when the static contact is in contact with the flexible touch module 1031. The at least two electrodes 104 are arranged at two ends of the flexible touch module 1031, respectively.

The controller further includes a data conversion module configured to convert the current signal received by the at least two electrodes 104 into the waistline data. The data conversion module may include: an analog-to-digital (A/D) converter configured to convert the current signal received by the at least two electrodes 104 into a digital signal; an operation module configured to convert the digital signal into position information about a contact point where the static contact is in contact with the flexible touch module and acquire the waistline data in accordance with the position information; and a storage module configured to store the waistline data.

When the belt is buckled, one side of the belt body 103 of the belt is inserted into the belt clip portion 101, the current generated when the static contact on the belt clip portion 101 is in contact with the flexible touch module on the belt body 103 is received by the electrodes 104, and then the current signal is converted by the controller into the waistline data and displayed in real time on the display screen. Because the static contact is in contact with the flexible touch module in a sliding manner, so it is able to read the waistline data continuously, thereby to ensure the accuracy of the data.

The static contact is arranged at the belt clip portion of the belt buckle 100. A weak current of 0.1 to 0.5 mA, which is safe to human beings, may be supplied to the static contact through an internal wire of the belt clip portion by the power supply module. The flexible touch module 1031 may be made of Teijin, or a display controlling component with low power consumption may be used to achieve the flexible touch. The flexible touch module may use known positioning and driving modes based on a programmable logic unit such as programmable array logic (PAL), generic array logic (GAL) or field programmable gate array (FPGA).

To be specific, the measurement of the waistline data using the belt will be described hereinafter.

When the belt is buckled, the static contact on the belt clip portion 101 is in contact with the flexible touch module on the belt body 103, so as to generate a weak current of 0.1-0.5 mA. Then, the current is received by the at least two electrodes 104 surrounding the flexible touch module. In accordance with a principle of a touch panel, a size of the current received by the at least two electrodes 104 changes along with a change in a position where the static contact is in contact with the flexible touch module, i.e., there is a mathematical relationship between the current and the contact position (i.e., a tying-up amount of the belt).

As shown in FIG. 6, when the belt is buckled, the static contact is in contact with the flexible touch module at a certain point, and a weak current is received by the at least two electrodes 104. The current is converted by the A/D converter into a digital signal. Then, the digital signal is converted by the operation module inside the controller into coordinates (X1, X2) of a contact point A in an extension direction of the belt body (i.e., in a lengthwise direction of the belt body). Next, a position of the contact point A where the static contact is in contact with the flexible touch module may be determined in accordance with X1 and X2. For example, when X1=720 mm, the waistline is equal to a sum of X1 and a length of the belt buckle 100. The resultant waistline data may be stored in the storage module, and displayed at the display screen under the control of the controller.

In addition, measurement time data may also be stored in the storage module, so that the user may take and look up the waistline data at a certain time through an input device on the belt.

Alternatively, the at least two electrodes include four electrodes arranged at four corners of the flexible touch module, respectively. As shown in FIG. 6, the currents received by the four electrodes are converted into digital signals by the A/D converter, and then the digital signals are converted by the operation module in the controller into coordinates (X1, X2, Y1, Y2) of the contact point A in the lengthwise and widthwise directions of the belt body. Then, the position of the contact point A where the static contact is in contact with the flexible touch module may be determined in accordance with X1 and X2, Y1 and Y2 may be used to modify the waistline data, so as to obtain the accurate waistline data.

In addition, the controller 302 may also be configured to receive the waistline data from a detection module, and output a control signal to the audio module in accordance with the waistline data. In this way, when the waistline data of the user exceeds a predetermined value, an alarm may be sent by the audio module on the main board 300, so as to remind the user to pay attention to health. It should be appreciated that, when the user's waistline data exceeds a predetermined value, an alert lamp may also be used to give a warning.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A belt comprising:
a belt buckle which comprises a wearable display device; wherein the wearable display device comprises a body, a display screen arranged on the body, a storage module configured to store data, and a controller configured to output a display signal in accordance with the data stored in the storage module, thereby to enable the display screen to display the display signal output from the controller;
a belt body;
wherein a flexible touch module is arranged on the belt body in an extension direction of the belt body;
wherein a belt clip portion of the belt buckle for buckling the belt body is provided with a static contact configured to be in contact with the flexible touch module so as to generate a current;
wherein the belt body is provided with at least two electrodes configured to receive a current signal generated when the static contact is in contact with the flexible touch module, and the at least two electrodes are arranged at two ends of the flexible touch module, respectively; and
wherein the controller further comprises a data conversion module configured to convert the current signal received by the at least two electrodes into waistline data.

2. The belt according to claim 1, wherein the data conversion module comprises:
an analog-to-digital (A/D) converter configured to convert the current signal received by the at least two electrodes into a digital signal;
an operation module configured to convert the digital signal into position information of a contact point where the static contact is in contact with the flexible touch module and acquire the waistline data in accordance with the position information; and
a storage module configured to store the waistline data.

3. The belt according to claim 1, wherein the wearable display device further comprises: a power supply module configured to supply power to the controller, the storage module and the display screen; and
a light sensor configured to detect light intensity and generate a light sensing signal;
wherein the controller comprises:
a first control module configured to control the display screen to adjust its brightness in accordance with the light sensing signal from the light sensor.

4. The belt according to claim 3, wherein the power supply module comprises a solar power supply module and a storage battery power supply module;
the controller further comprises a second control module configured to receive the light sensing signal from the light sensor, and control the solar power supply module to supply power to the controller and control the solar power supply module to charge the storage battery power supply module when the light sensing signal is greater than a predetermined value; and
a third control module configured to receive the light sensing signal from the light sensor, and control the storage battery power supply module to supply power to the controller and control the solar power supply module to receive solar energy when the light sensing signal is less than the predetermined value.

5. The belt according to claim 1, wherein the wearable display device further comprises a power supply module configured to supply power to the controller, the storage module and the display screen, and a distance sensor configured to detect a distance between an external occlusion and the body of the belt buckle and generate a distance sensing signal; and
the controller further comprises:
a fourth control module configured to control on and off states of the power supply module in accordance with the distance sensing signal from the distance sensor.

6. The belt according to claim 1, wherein the display screen is a flexible screen protruding toward an outer side of the body and having a curved surface.

7. The belt according to claim 1, wherein the display screen comprises a display surface, a back surface opposite to the display surface, and a reflective layer arranged at a side of the back surface of the display screen.

8. The belt according to claim 1, wherein the display screen comprises a transparent touch panel connected to the controller and having a touch function, and a display panel connected to the controller and having a display function, and the display panel is located below the transparent touch panel.

* * * * *